United States Patent [19]

Segal

[11] 3,833,453
[45] Sept. 3, 1974

[54] NONFLAMMABLE, FIBER-FILLED, COLD-FORMABLE THERMOPLASTIC SHEET

[75] Inventor: Leon Segal, Morristown, N.J.

[73] Assignee: Allied Chemical Corporation, New York, N.Y.

[22] Filed: Aug. 4, 1971

[21] Appl. No.: 172,348

[52] U.S. Cl. ............ 161/151, 117/126 GB, 161/93, 161/156, 161/170, 161/189, 161/192, 161/403, 161/DIG. 4, 260/87.5 B, 156/221, 264/294
[51] Int. Cl. ... B32b 17/04, C08f 37/00, C08f 45/10
[58] Field of Search ...... 161/156, 189, 403, DIG. 4, 161/170, 93, 151, 192; 260/87.56, 87.5 A; 117/126 GB, 76 R, 76 T

[56] References Cited
UNITED STATES PATENTS

| | | | |
|---|---|---|---|
| 2,392,378 | 1/1946 | Hanford | 260/87.5 A |
| 2,412,960 | 12/1946 | Berry | 117/126 GB |
| 2,448,952 | 9/1948 | Berry | 117/126 GB |
| 2,577,214 | 12/1951 | Slayter | 161/72 |
| 2,584,126 | 2/1952 | Hanford | 260/87.5 B |
| 2,731,068 | 1/1956 | Richards | 161/DIG. 4 |
| 3,385,749 | 5/1968 | Hampshire | 161/59 |
| 3,501,446 | 3/1970 | Ragazzini et al. | 260/87.5 B |
| 3,556,965 | 1/1971 | D'Agostino et al. | 260/87.5 B |
| 3,664,909 | 5/1972 | Ackley | 161/156 |

*Primary Examiner*—George F. Lesmes
*Assistant Examiner*—Charles E. Lipsey
*Attorney, Agent, or Firm*—Arthur J. Plantamura

[57] ABSTRACT

Glass fiber-reinforced ethylene chlorotrifluoroethylene composite sheets are formable into shaped objects in a mold at ambient temperatures solely by moderate preheating of the sheet outside of the mold. This polymer comprising a high molecular weight, tough copolymer of ethylene and chlorotrifluoroethylene in an approximate 1:1 mol ratio is inherently nonflammable in air. A glass fiber of controlled length increases the mechanical properties of the composite structure and allows fabrication into suitable shapes without detracting from the nonflammable properties of the polymeric composite.

6 Claims, No Drawings

NONFLAMMABLE, FIBER-FILLED, COLD-FORMABLE THERMOPLASTIC SHEET

BACKGROUND OF THE INVENTION

The reinforcement of synthetic polymeric materials with glass fibers is well known to the art. Items prepared from such materials find varied uses that take advantage of the high strength-to-weight ratio that results from the combination of glass fiber and plastic. In the past, because of the requisite properties desired, it was felt the plastics employed in such compositions should be thermosetting. Shaping of such articles has involved curing under temperatures and pressures which are relatively time consuming; also, while such thermoset materials as exemplified by epoxy resins and unsaturated polyesters are extremely strong and stable, they can not be reshaped once they are formed. Thermoplastic polymers in general partially overcome this disadvantage since they may be re-formed with the application of heat and pressure. Many thermoplastic polymers can be formed at ambient temperatures by means of sheet metal-forming techniques such as by deep drawing, stretch forming, stamping, etc. These cold sheet-forming processes are economically attractive because it is possible to achieve rapid production rates, e.g., rates that exceed one item a second. However, the thermoplastic products prepared by prior art techniques exhibit deficiencies in their properties (low heat distortion temperature, poor dimensional stability under load, tendency for stress cracking, low modulus and strength) and have other deficiencies that prohibit their use in either structural or fire-retardant applications, i.e., they sustain and propagate combustion. Moreover, with respect to naturally nonflammable polymers per se, that is, polymers which have inherent flame-retardant characteristics without additives, it has not been previously considered possible to shape such compositions by these techniques; these specialized thermoplastics possess the general properties and deficiencies of other thermoplastics and, in addition, have some unique disadvantages such as nonadhesiveness, low coefficient of friction and flow properties which prohibit their being processed by known thermoplastic production methods.

While it may be expected that the heat distortion temperature, impact resistance, and modulus of a shaped item may be enhanced in some cases in a process where glass-reinforced, thermoplastic sheets are preheated prior to shaping, this technique has not heretofore been considered applicable to the ethylenechlorotrifluoroethylene nonflammable copolymers or to other polymers containing large amounts of flame retardants because this results in poor flow properties and nonformability because of the elastic nature of the polymer. Attempts to overcome these problems by altering the process or the construction of the sheets without affecting essentially the rate of production (or the residence time in the mold) have not been entirely suitable.

It would, therefore, be desirable to obtain thermoplastic material with essentially inherent nonflammable characteristics and properties adequate for structural applications which is formable at ambient temperatures because such a material would find numerous uses where fire control is critical, e.g., in ships, airplanes, rockets; in homes; in boiler rooms; for pipe; for lighting fixtures and for motor housings; as insulation; and for electrical applications.

Practical difficulties are usually encountered in processing naturally nonflammable thermoplastics by conventional polymer processing techniques. More specifically, nonflammable polymers such as polytetrafluoroethylene do not flow easily above crystalline melting points because of extremely high melt viscosities. These high melt viscosities are caused by the high molecular weights necessary to achieve the desired properties and concurrently by the chemical nature of the polymer that results in extreme restriction of molecule rotation about the chain bonds. Attempts to cause flow by application of high stresses above the melting points of these polymers usually result in fracturing rather than producing a practical flow of the polymer.

Additionally, the extreme nonadhesiveness of these naturally nonflammable polymers such as polytetrafluoroethylene does not readily allow reinforcement with glass fibers except by nonconventional techniques consisting of special fiber or polymer pretreatment or modification. The unique nonadhesive nature of polytetrafluoroethylene results in the incorporated fibers acting as a nonfunctional or detrimental filler rather than as an integrated reinforcement. The incorporated fibers do not increase the mechanical strength properties of the composite and may actually decrease certain strength properties since these fibers act as voids or defects. Thus, incorporation of such fibrous fillers is often limited to 25 percent or less by weight, and since reinforcement is not achieved, these composites are not applicable where load support stiffness, high strength properties or elevated-temperature use are mandatory. In addition to these problems, it has been found that, even where good fiber-to-polymer adhesion can be achieved, certain strength properties may be actually decreased by incorporation of short (i.e., ⅛ to ½ inch long) reinforcing fibers even though such short fibers are necessary if the composite material is to be processed by any of the rapid polymer processing methods used heretofore, as for example, by injection molding. The incorporation of these relatively short fibers into the generally tough and ductile, naturally nonflammable polymer matrixes often results in a reduction of ductility without a compensating reinforcement effect necessary to affect this loss of ductility. Thus, the shock absorption of such filled polymer system is decreased as is evidenced by a decrease in impact strength as the fiber concentration increases. Attempts have been made to circumvent this difficulty by using long, glass fiber reinforcement (1 inch or greater) since such a reinforcement is much more efficient than short-fiber reinforcement. However, as stated previously, such a reinforced system is not readily processable by extrusion, injection molding, or other standard, high-speed, thermoplastic production methods.

By using the system and molding procedure, which is the object of this invention, the shortcomings of previous systems are avoided, and a processable, nonflammable, high strength system is obtained.

SUMMARY OF THE INVENTION

This invention relates to glass fiber-reinforced, nonflammable, thermoplastic polymer composite sheets that can be fabricated into shaped objects or structural parts. More particularly, this invention relates to a composite sheet consisting of high molecular weight, thermoplastic copolymers of ethylene and chlorotrifluoroethylene (E-CTFE) reinforced with long glass fibers where the said composite can be shaped into items of desired geometry in a shaping apparatus operating at essentially ambient temperature if the said sheet is preheated to a temperature above the softening point of the polymer.

In accordance with the invention, I have discovered a system that allows the use of a high melting, high molecular weight, naturally nonflammable copolymer of E-CTFE, which has excellent strength and high temperature properties, in a cold mold-stamping operation. It is necessary that the glass fiber reinforcement in the compositions of the invention be of lengths of at least about 1 inch in order to maintain sheet coherency during the external preheat stage and in order to impart excellent mechanical properties for structural applications up to temperatures of 300°C or higher. In addition to discrete strands of glass fibers having a length of at least 1 inch, the glass reinforcement or filler may be in the form of nonwoven mat, loose entangled fibers, or woven mat.

These forms of reinforcement are furthermore necessary to maintain sheet coherency during the preheat and transfer stages in which the reinforced molten sheet is inserted into a cold mold for stamping into the desired object. Glass loading levels up to 40 percent by weight of the total composition are feasible with the system as described herein.

An alternate method of forming the formable sheet consists of forming a laminated structure in which at least one of the layers consists of the sheet material prepared in accordance with the present invention, i.e., combining a long fiber-reinforced, nonflammable E-CTFE copolymer sheet with at least one additional layer which may consist of unfilled or inorganic mineral-filled E-CTFE copolymer or of glass fiber-filled, or mineral filled, or unfilled, polymers other than E-CTFE, which may be bonded with or without adhesive to the fiber-filled substrate of E-CTFE. Filler materials useful herein, which may be used in conjunction with, or independently of, in a laminated sheet include a wide variety of minerals, metals, metal oxides, metal hydroxides, metal salts and silicates, siliceous materials, and mixtures thereof. In general, all noncombustible, high melting particulate inorganic or organic (e.g., carbon black) fillers are suitable. Fillers may or may not be pretreated with standard coupling or adhesion-promoting agents. High modulus fillers are preferable, but are not mandatory. By high modulus is meant a Young's modulus of $10^7$ psi, or more. Examples of preferred fillers include alumina, feldspar, talc, asbestos, limestone, lime, graphite, etc.

All the systems utilizing the E-CTFE copolymers as the matrix resins are found to exhibit excellent properties such as great impact strength, stiffness, and high heat distortion temperature that cannot be obtained by nonflammable polymer reinforced with short-fiber reinforcement as known in the prior art. In addition, a thermoplastic polymer reinforced with such short fibers would not be processable by the method of this invention since such short fiber-reinforced plastics would not possess the inherent strength necessary to retain the integral nature of the composite during the preheat and transfer stages. In actuality, such a short fiber-reinforced sheet would disintegrate or fall apart if handled during the preheat stage. By using the system and process of this invention, on the other hand, extremely high mechanical properties necessary for structural applications are obtained, and the integrity of the composite material is maintained during the preheat and transfer stages of this operation. Furthermore, by incorporation of the glass fiber, the disadvantage of the elastic nature of the polymer is minimized.

It is an object of this invention to provide a novel, long glass fiber-reinforced composite sheet of high melting, nonflammable crystalline copolymer that may be shaped in a cold mold.

Another and more specific object of the invention is to provide novel composite sheets of copolymers of ethylene and chlorotrifluoroethylene, and mixtures thereof, in an approximate mol ratio of 1:1, which are reinforced with glass fiber and/or other mineral filler, which have a high melting temperature, and which may be shaped using a relatively rapid cycle by use of a cold mold.

Still another object of this invention is to provide a method that allows the preheating and handling of these reinforced sheets prior to stamping or forming in a shaping apparatus which may be held at ambient temperature.

These and other objects of the invention will become apparent from the accompanying description and examples.

DESCRIPTION OF THE PREFERRED EMBODIMENTS

In accordance with the invention, I have found that exceptionally good shaped products may be obtained from composite, long glass fiber-filled nonflammable thermoplastic sheets prepared from copolymers of ethylene and chlorotrifluoroethylene. In particular, items produced from glass-reinforced E-CTFE copolymers show excellent performance at elevated temperatures and exceptional dimensional stability (low creep and low moisture absorption) and are naturally flame retardant and nonburning.

Suitable alternating copolymers of ethylene and CTFE that may be employed are those polymers having a melting temperature of at least 240°C with at least 70 percent monomer alternation. Specifically, E-CTFE with a crystalline melting temperature of 240°–250°C with a minimum degree of monomer alternation of 80 percent of the A-B type (. . . A-B-A-B-A-B-A-B . . . where A represents ethylene monomer and B represents CTFE monomer) produce particularly advantageous results. These copolymers may be referred to as naturally nonflammable polymers, which means primarily halogenated hydrocarbons that require no complementary flame-retardant additives or intermediates. Other naturally flame-retardant polymers are, for example, unplasticized polyvinyl chloride and polycarbonates, although these materials are generally inferior to the halogenated hydrocarbons in inherent flame retardance. By nonflammability, we mean here polymers that do not burn except in atmospheres that contain more than 21 percent oxygen, i.e., the amount of oxygen present in air. A measure of flammability, the "oxygen index," measures the level of oxygen in the atmosphere required to support combustion of a material for a specified minimum length of time, specifically, 3 minutes. Thus, all materials with an oxygen index greater than 21 percent are "nonflammable" in air for all practical purposes, although materials with higher oxygen indexes can be considered to be theoretically more nonflammable. For more stringent applications, an oxygen index of approximately 27 percent may be required, which would preclude burning under any foreseeable commercial applications.

Copolymerization may be performed in an aqueous suspension system at 300–400 psi pressure and at temperatures between −78°C and +50°C. To effect polymerization, the use of appropriate peroxide-initiating catalysts or gamma radiation may be employed, as is known to those skilled in the art. The chemical and physical properties of the polymer are dependent upon the exact reaction conditions selected. The oxygen index of such a material, as described above, is 64 percent, which indicates that three times the normal amount of oxygen must be present before E-CTFE copolymer will burn.

The E-CTFE copolymer used in the process of this invention should be processable by standard thermoplastic processing techniques. That is, its molecular weight should be in a range as defined below. Copolymers with melt indexes of 0.5 to 50 (under a load of 21,600 g. at 275°C) can be processed conventionally and produce copolymers with satisfactory physical and mechanical properties. Specifically, polymers of melt index 0.7 to 35 produce particularly satisfactory products. The melt index, as given by ASTM test D1238-65, is defined as the mass rate of flow of polymer through the specified capillary under controlled conditions of temperature and pressure. More direct measurements of molecular weight (or processability) are not applicable in the case of E-CTFE copolymer since a suitable solvent necessary for molecular weight determination has not been found.

Such copolymers are fabricated into shaped articles by the process of this invention by incorporating into the copolymer matrix a high modulus ($10^7$ psi or more) fibrous reinforcement, preferably glass fiber reinforcement. The term glass fibers, as used herein, is intended to be employed in a broad sense to include glass cloth as well as individual long fibers, more particularly known as chopped filaments, which have a length greater than 1 inch and preferably between about 1.25 inches to about 3.0 inches although other forms of glass such as continuous strand mat, chopped or continuous roving, woven roving, and the like may be employed. Also, mechanically bound discontinuous, nonwoven glass roving, yarn or strands may be employed. The method of mechanical binding may be by "needling," i.e., stitching with glass, or by depositing the glass reinforcement in such a manner as to form an entangled, stable mat. Preferably all the glass or other fibrous reinforcement used in conjunction with the E-CTFE copolymer is processed through the standard sizing or pretreatment operations, as is known to those skilled in the art. It is noteworthy that the presence of glass fiber in the nonflammable E-CTFE matrix has no adverse effects on the flammability rating of the composite. This appears in distinct contrast to the behavior ordinarily observed when flammable or some pseudononflammable polymer materials (as for example, materials made flame-retardant by means of additives) are reinforced with glass. In the latter case, although the glass fiber itself is nonburning, the flame-retardance of the resin composition appears impaired so that the flammability of many such polymers is greater. This is considered attributable to the fact that, as the flammable or slightly flammable polymer burns and melts, the glass fibers act as an internal web and prevent molten, burning polymer from dripping away and instead act as a wick with a molten, burning polymer coating continually feeding the flame to the bulk of the hot polymeric phase. Such a behavior is surprisingly not observed with the relatively long glass fiber-filled E-CTFE copolymer composition of the invention. This has been observed in atmospheres containing less than 64 percent oxygen, which, as a practical matter, covers substantially all situations. Furthermore, in the E-CTFE glass-reinforced composition of the invention, the glass actually serves to dissipate away heat that is present in a fire-prone atmosphere and thus reduces the chance for fire promotion even further. In addition, I have found that layered compositions comprising sheets of E-CTFE copolymer as the matrix and glass fiber or glass fiber in combination with asbestos or other mineral filler such as silica also produce highly advantageous results. Compositions containing reinforcing fibers, including asbestos, in proportions of from 75 to 5 percent, and preferably from 50 to 10 percent, based upon the weight of the total composition, are particularly desirable from the standpoint of improved strength properties. It should be noted that short glass fiber-filled E-CTFE copolymer, as may be used for injection molding purposes, would be expected to have an oxygen index significantly lower than 64 percent and very possibly below 27 percent, based on past experience with similar materials.

Various processing techniques may be employed in the preparation of the reinforced composite sheets of the present invention. Plastic sheets may be extruded separately and then placed into a number of alternating plastic sheet-glass mat layers, which are thoroughly fused under heat and pressure; or plastic powder or pellets may be dispersed into layers of nonwoven glass mat or loose glass fibers and fused under heat and pressure; or a continuous extrusion-lamination line may be used to produce an endless composite sheet, for example. The incorporation of suitable plasticizers into the formable sheet composition in concentrations which may vary up to about 35 percent or even more may be advantageous in some applications providing such additives do not substantially detract from the nonflammability of the composition. Illustrative plasticizers include, for example, the phosphate esters such as tricresyl phosphate, cresyl diphenyl phosphate, octyl diphenyl phosphate, triphenyl phosphate, triethyl phosphorothioate, or diphenyl-xylenyl phosphate, etc. Other satisfactory plasticizers include epoxy derivatives, phthalate esters, adipic and azelaic acid derivatives, glycol derivatives, and the like.

Shaping of the sheet is accomplished by forming under pressure in a comparatively cold mold (cold mold, as employed herein, is intended as synonymous with a mold at ambient temperature, i.e., a shaping apparatus which is not required to be heated during the shaping cycle) or other shaping apparatus. Preferably, prior to molding or shaping, the composite sheet is preheated outside of the mold or forming apparatus to a temperature of about the softening point, or higher, of the polymer. This preheated sheet is then transferred rapidly to the forming mold where the shaping pressure is applied. Retention in the mold is limited to relatively short duration, e.g., 1–30 seconds, or until the shape cools that relative small temperature increment to allow the shape to be self-sustaining. The exact time in the mold is thus a function of part thickness, complexity, and glass content.

The following examples illustrate further this invention and are not to be construed as necessarily limiting the invention. All parts are parts by weight, except where otherwise expressly stated.

EXAMPLE 1

Glass-reinforced E-CTFE copolymer sheet is prepared using a polymer having a melt index of 1.1 at 275°C and 21,600 g. Ground and dried polymer is dispersed between layers of nonwoven glass mats constructed from discontinuous, chopped glass fibers having a minimum length of 2 inches and a maximum length not exceeding about 4 inches. Seven layers of glass mat weighing ¾ oz. per sq. ft. are used to produce an ⅛ inch-thick composite sheet whose weight ratio of polymer to glass is about 60:40. It is advantageous to distribute the polymer so that there is a slight excess of polymer at the top and bottom surfaces producing a smoother surface. Fusion of the sandwich assembly can be carried out in a compression mold at 260°C. The final step of fusion is carried out at 300 psi for 10–15 min. The sheets can be cooled in the press under pressure to reduce warpage.

Shaping was accomplished in a deep drawing press which had a triple action die-set to produce 5 inch-dia. cylindrical cups 2 inches deep. The glass-reinforced composite sheet was preheated to 260°C for 3 min. in an infrared oven. Oven temperature and preheat time are controlled to prevent degradative crosslinking of the copolymer. Excessive heating may also result in a molecular weight increase owing to partial crosslinking, which is detrimental to the shaping and use of this composite.

The preheated sheet was transferred to and stamped in a conventional metal-stamping manner with the die at room temperature (23°C) with the exception that the dwell time was 10 sec. to allow the shaped part to crystallize in the mold and to cool only to a temperature allowing the shape imparted to be retained, i.e., about 150°C, before removing from the press. The stamping pressure was 1,000 psi. Physical properties were determined upon the part thus obtained by cutting test specimens from the shaped cup. The properties obtained are shown in Table I.

TABLE I

| Properties | Mechanical Properties | |
|---|---|---|
| | 60/40 E-CTFE/Glass Composites | E-CTFE Copolymer |
| Melt Index | 1.7 g./10 min. | 1.7 g./10 min. |
| Tensile Strength | 21,000 psi | 7,600 psi |
| Ultimate Elongation (UE) | 1.9% | 250% |
| Flexural Strength | 19,000 psi | 6,200 psi |
| Flexural Modulus | $0.8 \times 10^6$ psi | $0.22 \times 10^6$ psi |
| Impact Strength | 20 ft-lb/in of notch | No break |
| Heat Deflection Temperature | >245°C at 264 psi | 77° at 264 psi |
| | 233°C at 528 psi | 1152C at 66 psi |
| Oxygen Index at 3 min. | 65–67% | 64% |

From Table I it is seen that the UE at break has been decreased from 250 percent to less than 2 percent by incorporating 40 percent glass-fiber reinforcement. The flexural strength and tensile modulus have been similarly increased by a factor of 4 imparting enough rigidity to allow application as a structural component such as wall facing. The extremely high loading allows for structural integrity under the high heat encountered where the nonflammability of the polymer is an important property. The oxygen index is retained above the minimum of 21 percent even at this high glass loading level, and in fact appears to be slightly higher than the oxygen index of the unreinforced copolymer.

EXAMPLE 2 (COMPARATIVE)

The preferential effect of the long glass-fiber reinforcement upon the mechanical properties of reinforced E-CTFE copolymer was determined by blending the E-CTFE with glass fibers in the same proportion as in Example 1, but of short length, i.e., ¼ inch in length. This 40 percent glass-filled mixture was then compression molded to fuse the composite as in Example 1. Attempts to shape these sheets in the stamping press, as outlined in Example 1, were unsuccessful since the composite sheet reinforced with short glass fibers upon preheating was not self-sustaining, i.e., it did not possess integral stability and actually disintegrated during the transfer of the preheated sheet to the forming press even before it could be shaped. It was, therefore, not practical to shape such a sheet by the shaping process outlined in this invention. Mechanical property tests were, therefore, performed upon the 40 percent short glass-filled composite unshaped sheet as fused in the compression molding press according to the procedure of Example 1. Results are presented in Table II, which compares the tensile properties of long glass fiber-reinforced E-CTFE to short glass fiber-reinforced E-CTFE.

TABLE II

Tensile Properties of 40% Glass Fiber-Filled E-CTFE

| Properties | Glass Fibers | |
|---|---|---|
| | 2" Long | ¼" Long |
| Ultimate Tensile Strength (UTS), psi | 21,000 | 14,000 |
| Ultimate Tensile Elongation (UTE), % | 1.9 | 1.4 |
| Tensile Modulus (TM), psi | $1.3 \times 10^6$ | $1.1 \times 10^6$ |

It is seen that the TM of both samples are roughly equivalent, since the modulus is highly dependent upon reinforcement concentration only. The UTS of the long fiber-reinforced material, however, is 50% higher than that of the short fiber-reinforced material reflecting the higher load transfer efficiency of long fibers as compared to short fiber reinforcement.

The substantial effect of the long glass fiber reinforcement upon the impact resistance of reinforced E-CTFE copolymer was examined by comparing the notched Izod impact strength of ¼ inch-long glass-reinforced E-CTFE. The short fiber-reinforced specimens were compression molded according to the procedure of Example 2, and once again, these sheets could not be formed by the procedure of this invention because of a lack of integrity of the composite sheet during the preheat stage, and so the compression molded plaques were cut into test specimens. In the case of the 40 percent, 2 inch-long glass fiber-filled polymer, the plaque was molded into cups by the procedure outlined in Example 1, and test specimens were cut from these cups. Test results are presented in Table III.

TABLE III

Impact Strength of E-CTFE Composites

| % Loading | Fiber Length | Notched Izod Impact Strength |
|---|---|---|
| 10 | ¼" | 15.4 |
| 20 | ¼" | 14.7 |
| 40 | ¼" | 14.0 |
| 40 | 2" | 20.0 |

From this table it is seen that, as the amount of short fiber reinforcement increases, the impact strength actually decreases. While this behavior should not be expected to continue, i.e., at a certain level of reinforcement the impact strength should begin to increase with the degree of fibrous reinforcement, nevertheless, in comparing the impact strength of the 40 percent long fiber-filled E-CTFE with the impact strength of the 40 percent short fiber-filled polymer, it is seen that the extra efficiency of the long fibers results in a substantially increased notched impact strength, i.e., 43 percent higher, than that obtained with the short fiber reinforcement.

EXAMPLE 4

A tri-layer, laminated composite sheet is prepared by compression molding each of the component layers as described in Example 1. The top layer is a composite of 40 percent long glass fiber-filled (at least 1.25 inches in length) E-CTFE of thickness 0.070 inch. The center layer was a composite of 50 percent long glass fiber-filled polyethylene terephthalate polymer of thickness 0.025 inch. The bottom layer was a sheet of pure E-CTFE copolymer of thickness 0.005 inch. The three sheets are layered in the order mentioned and fused together at 265°C and 50 psi pressure between the platens of a compression molding press. This laminated composite is then preheated in an infrared oven at 270°C for 2.5 min., transferred to the cold stamping press and stamped into a 5 inch-dia., 2-inch deep cylindrical cup at 1,000 psi pressure. Dwell (residence) time in the press is about 10 sec. Mechanical test specimens were cut from the flat section of the cups thus formed. Mechanical Properties for this laminated composite are listed in Table IV.

TABLE IV

Mechanical Properties of Tri-Layer Composite

| | |
|---|---|
| Tensile strength | 22,000 psi |
| Tensile Modulus | $1.25 \times 10^6$ psi |
| Ultimate Elongation | $2.0 \times 10^6$ psi |
| Flexural Strength | 26,000 psi |
| Flexural Modulus | $1.1 \times 10^6$ psi |
| Impact Strength | 20 ft-lb/in |
| Heat Deflection Temperature | >240°C at 264 psi |

TABLE IV-Continued

Mechanical Properties of Tri-Layer Composite

| | |
|---|---|
| Oxygen Index (Broadface) | 64% |

It is seen that the mechanical strength and modulus are increased by incorporation of the heavily loaded (center) composite of flammable polyethylene terephthalate. However, the effective oxygen index remains unchanged since this center layer is physically protected from the flame by the two external layers containing E-CTFE copolymer. The oxygen index is above the 21 percent minimum level, as in the previous examples.

EXAMPLE 5

An opaque, particulate-filled, fiber-reinforced E-CTFE composite was prepared by first melt blending the selected particulate filler with E-CTFE copolymer of melt index 20 in an extruder. Filler materials can be selected from a wide variety of minerals, metals, metal oxides, hydroxides, or salts, siliceous materials, carbon blacks, and mixtures thereof. In general many of these fillers can be treated with coupling agents to improve their adherent capability, although such treatment is not mandatory. The only absolute requirement that a particulate filler need possess for purposes of this invention is that it be totally nonflammable.

For purposes of this example, calcium carbonate of mean particle size 2.5 microns was selected as the particulate filler. A mixture of 200 parts $CaCO_3$ and 600 parts E-CTFE copolymer was extruded in a standard 1 inch extruder, quenched by air cooling, and pelletized. To this mixture 200 parts of loose glass fibers, minimum length 2 inches and maximum length about 4 inches, was added by distribution in a compression mold. The composition of this total mixture was 60/20/20 (% by weight) of E-CTFE/glass fiber/$CaCO_3$, respectively. The mixture was compression molded into plaques using the same molding cycle as given in Example 1. These plaques were then formed into 5 inch-dia. cups by the forming method which is the object of this invention and as described heretofore. Mechanical property tests were performed upon specimens cut from this formed object, and results are presented in Table V.

TABLE V

Mechanical Properties of 60/20/20 E-CTFE/Glass $CaCO_3$ Composite

| | |
|---|---|
| Melt Index | 20 g/10 min. (pure polymer) |
| Tensile Strength | 13,000 psi |
| Tensile Modulus | $0.85 \times 10^6$ psi |
| Ultimate Elongation | 1.7% |
| Flexural Strength | 17,000 |
| Flexural Modulus | $0.84 \times 10^6$ psi |
| Impact Strength | 18 ft-lb/in of notch |
| Heat Deflection Temperature | <245°C at 264 psi |
| Oxygen Index at 3 min. | 67% |

It can be seen that the mechanical properties, although slightly different from those presented in Table I, are still excellent and sufficient for many structural applications. The similarity in mechanical properties, especially modulus, are to be expected since the percent reinforcement and/or filler in both Example 5 and Example 1 are approximately equal on a total volume basis. However, the superiority of fibrous reinforcement over particulate filler is exhibited in the higher tensile and flexural strengths exhibited by the composite of Example 1, which contains a higher percentage of fibrous component. It is also of prime interest to note that the oxygen index has not been adversely affected since $CaCO_3$ filler is totally incombustible.

Although the invention has been described by reference to the foregoing specific embodiments, it will be understood that various substitutions, changes and modifications in the compositions and process and details thereof may be made by those skilled in the art without departing from the spirit or essence of the invention.

What is claimed is:

1. A glass reinforced high impact resin sheet having high interlaminar strength and an oxygen index of at least 64 percent which is formable in shaping apparatus held at ambient temperature consisting essentially of a copolymer of ethylene-chlorotrifluoroethylene incorporating a glass fiber reinforcement in amounts of at least 5 percent by weight of the total weight of the composition, said glass fiber having a length of at least one inch, said copolymer having a melting temperature greater than 240°C., a degree of monomer alternation greater than 70 percent and a melt index of 0.5 to 50.

2. A sheet in accordance with claim 1 characterized by at least two sheets formed into a laminated composite.

3. The laminated composite of claim 2 wherein at least one laminate is unfilled polymer.

4. The laminated composite of claim 3 wherein the unfilled polymer laminate is ethylene-chlorotrifluoroethylene copolymer.

5. The laminated composite of claim 2 wherein at least one laminate of the composite is an ethylene-chlorotrifluoroethylene copolymer incorporating a filler selected from the group consisting of alumina, feldspar, talc, asbestos, limestone, lime, graphite, and siliceous materials other than glass fiber.

6. A glass reinforced high impact resin article having high interlaminer strength and an oxygen index of at least 64 percent formed in shaping apparatus held at ambient temperature and consisting essentially of a copolymer of ethylene-chlorotrifluoroethylene having a melting temperature greater than 240°C., a degree of monomer alternation greater than 70 percent and a melt index of 0.5 to 50 incorporating a glass fiber reinforcement in amounts of at least 5 percent by weight of the total weight of the composition, said glass fiber having a length of at least one inch.

* * * * *